(12) United States Patent
Yi

(10) Patent No.: US 7,821,512 B2
(45) Date of Patent: Oct. 26, 2010

(54) APPARATUSES FOR GENERATING ANALOG DRIVING VOLTAGES AND COMMON ELECTRODE VOLTAGES AND METHODS OF CONTROLLING THE ANALOG DRIVING VOLTAGES AND THE COMMON ELECTRODE VOLTAGES

(75) Inventor: Sang-Hak Yi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 882 days.

(21) Appl. No.: 11/166,689

(22) Filed: Jun. 23, 2005

(65) Prior Publication Data

US 2006/0050042 A1 Mar. 9, 2006

(30) Foreign Application Priority Data

Sep. 7, 2004 (KR) ................ 10-2004-0071287

(51) Int. Cl.
*G09G 3/36* (2006.01)
*G09G 5/00* (2006.01)
(52) U.S. Cl. .......................... 345/211; 345/98
(58) Field of Classification Search .......... 345/211, 345/98
See application file for complete search history.

(56) References Cited

U.S. PATENT DOCUMENTS

| 5,489,910 A | * | 2/1996 | Kuwata et al. ............. 345/212 |
| 2002/0050973 A1 | * | 5/2002 | Takaoka et al. ............ 345/100 |
| 2004/0080962 A1 | * | 4/2004 | Charych ................... 363/21.11 |
| 2005/0088105 A1 | * | 4/2005 | Tajiri et al. ............... 315/169.3 |

* cited by examiner

*Primary Examiner*—Amr Awad
*Assistant Examiner*—Randal Willis
(74) *Attorney, Agent, or Firm*—Innovation Counsel LLP

(57) ABSTRACT

In apparatus for generating an analog driving voltage, a ripple amplitude determining unit compares the analog driving voltage with a reference voltage to determine a ripple level of the analog driving voltage and an analog driving voltage generating unit adjusts an analog driving voltage level based on the determined ripple level. In an apparatus for generating a common electrode voltage, a common electrode voltage ripple detecting unit compares ripple amplitude of the common electrode voltage with a ripple reference voltage to generate a common electrode voltage control signal and a common electrode voltage generating unit controls the common electrode voltage level based on the common electrode voltage control signal. Therefore, the analog driving voltage and the common electrode voltage are adjusted to appropriate voltage levels for reducing current consumption and flicker.

19 Claims, 12 Drawing Sheets

1030

APPARATUSES FOR GENERATING ANALOG DRIVING VOLTAGES AND COMMON ELECTRODE VOLTAGES AND METHODS OF CONTROLLING THE ANALOG DRIVING VOLTAGES AND THE COMMON ELECTRODE VOLTAGES

CROSS-REFERENCE TO RELATED APPLICATIONS

This application claims priority under 35 USC §119 to Korean Patent Application No. 2004-71287, filed on Sep. 7, 2004, the contents of which are herein incorporated by reference in its entirety for all purposes.

BACKGROUND

1. Field of the Invention

The present invention relates to apparatuses for generating analog driving voltages and common electrode voltages and methods of controlling the analog driving voltages and the common electrode voltages.

2. Description of the Related Art

Generally, a liquid crystal display device includes a liquid crystal display panel for displaying images, a data driver for outputting an analog grayscale voltage to the liquid crystal display panel, a gate driver for outputting a gate driving signal through a plurality of gate lines to the liquid crystal display panel, a timing controller for outputting various timing control signals, a DC-to-DC converter, a grayscale voltage generating unit and a common electrode voltage generating unit.

The DC-DC converter receives a DC voltage from an external source and converts the DC voltage into an analog driving voltage (AVDD) for driving the data driver and the gate driver.

The AVDD voltage may be used to generate a gate turn-on voltage VON, a gate turn-off voltage VOFF and a grayscale reference voltage VDD. The gate driver outputs a plurality of gate driving signals through a plurality of gate lines to the liquid crystal display panel based on the gate turn-on voltage VON and the gate turn-off voltage VOFF. The grayscale voltage generating unit provides the grayscale reference voltage VDD to the data driver.

Meanwhile, the AVDD voltage has a considerable effect on the contrast ratio of a screen and a current consumption of the liquid crystal display panel.

Therefore, the analog driving voltage AVDD should be adjusted to an optimum AVDD voltage according to characteristics of loads in the liquid crystal panel, such as TFT transistors, capacitors, resistors, etc.

In addition, the common electrode voltage generating unit adjusts the common electrode voltage VCOM to a preset voltage to minimize flicker. However, differences between respective liquid crystal display devices or variation of the load characteristics of the liquid crystal panel cause variations in the common electrode voltage VCOM. Therefore, it is desirable to adjust the common electrode voltage VCOM to an appropriate voltage level for reducing flicker.

SUMMARY

Accordingly, the present invention is provided to substantially obviate one or more problems due to limitations and disadvantages of the related art.

It is a first feature of the present invention to provide an apparatus for generating an adjusted analog driving voltage in accordance with the load characteristics of the liquid crystal display panel.

It is a second feature of the present invention to provide an apparatus for generating an adjusted common electrode voltage in accordance with the load characteristics of the liquid crystal display panel.

It is a third feature of the present invention to provide a method for adjusting the analog driving voltage in accordance with the load characteristics of the liquid crystal display panel.

It is a fourth feature of the present invention to provide a method for adjusting the common electrode voltage in accordance with the load characteristics of the liquid crystal display panel.

In accordance with one aspect of the present invention, there is provided an apparatus for generating an analog driving voltage. The apparatus for generating the analog driving voltage includes a ripple amplitude determining unit and an analog driving voltage generating unit.

The ripple amplitude determining unit compares an analog driving voltage with a given reference voltage, and configured to determine a ripple level of the analog driving voltage. The analog driving voltage generating unit adjusts a voltage level of the analog driving voltage based on the determined ripple level of the analog driving voltage.

In accordance with another aspect of the present invention, there is provided an apparatus for generating a common electrode voltage. The apparatus for generating a common electrode voltage includes a common electrode voltage ripple detecting unit, a common electrode voltage generating unit and a common electrode voltage generating unit.

The common electrode voltage ripple detecting unit compares a ripple amplitude of a common electrode voltage with a predetermined ripple reference voltage to generate a common electrode voltage control signal for controlling a voltage level of the common electrode voltage, the common electrode voltage being detected from a common electrode of a liquid crystal display panel. The common electrode voltage generating unit controls the voltage level of the common electrode voltage based on the common electrode voltage control signal to generate the common electrode voltage.

In accordance with still another aspect of the present invention, there is provided a method of controlling an analog driving voltage. In the method, a ripple amplitude of an analog driving voltage is detected wherein a common electrode voltage and a grayscale reference voltage are generated based on the analog driving voltage. The analog driving voltage is compared with a given reference voltage to determine a ripple level of the analog driving voltage and a voltage level of the analog driving voltage is adjusted based on the determined ripple level of the analog driving voltage.

In accordance with still another aspect of the present invention, there is provided a method of controlling a common electrode voltage. In the method, a common electrode voltage is detected from a common electrode of a liquid crystal display panel and a ripple amplitude of the detected common electrode voltage is compared with a predetermined ripple reference voltage to generate a common electrode control signal for controlling the common electrode voltage. A voltage level of the common electrode voltage is adjusted based on the common electrode control signal.

BRIEF DESCRIPTION OF THE DRAWINGS

The present invention will become more apparent to those of ordinary skill in the art by describing, in detail, exemplary embodiments thereof with reference to the attached drawings, wherein like elements are represented by like reference

DESCRIPTION OF THE EXEMPLARY EMBODIMENTS

Figure 1:
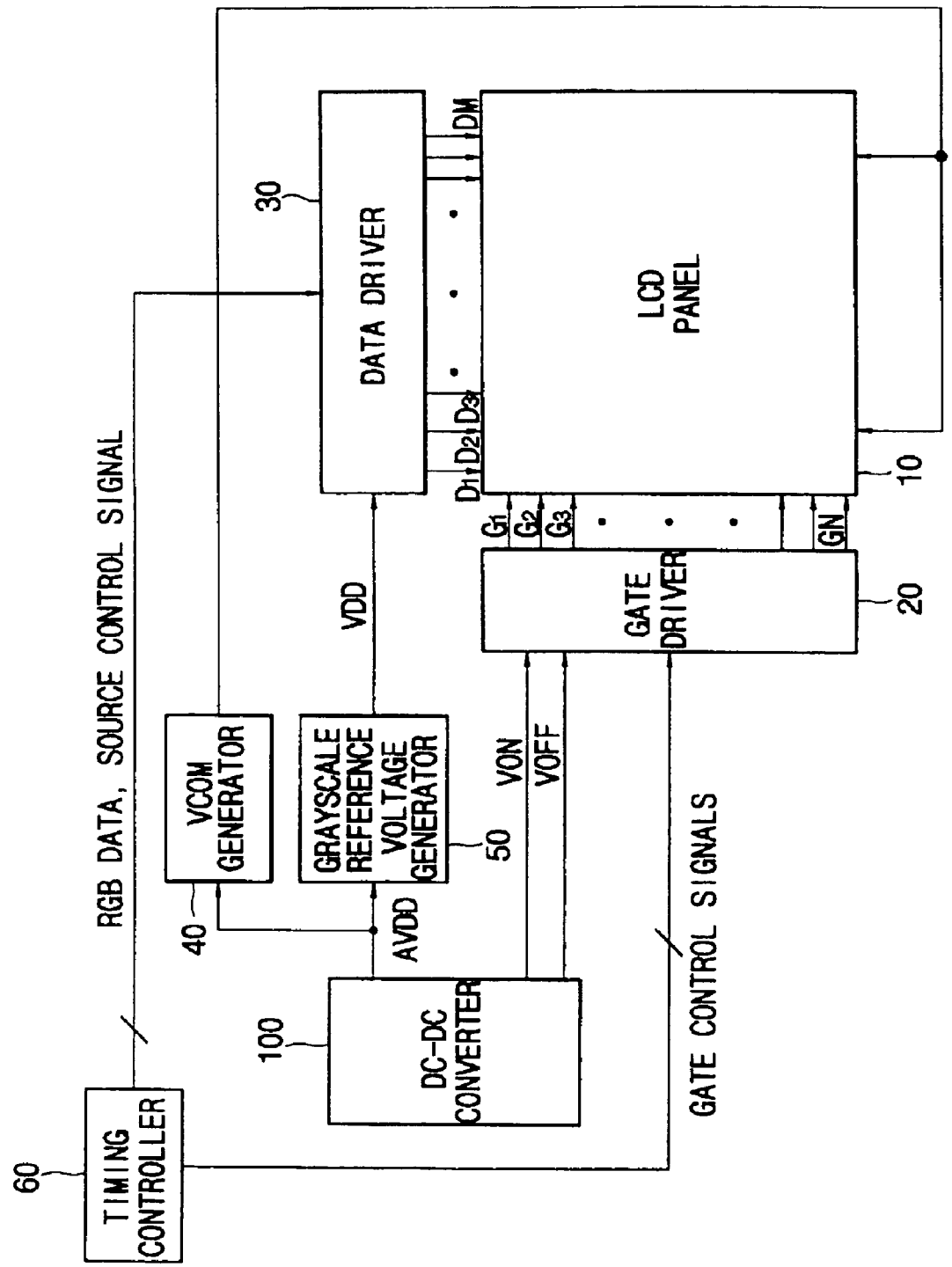
FIG. 1 is a block diagram illustrating a liquid crystal display device for adjusting an AVDD voltage according to an exemplary embodiment of the present invention.

The present invention will become more apparent to those of ordinary skill in the art by describing, in detail, exemplary embodiments thereof with reference to the attached drawings, wherein like elements are represented by like reference numerals, which are given by way of illustration only and thus do not limit the exemplary embodiments of the present invention.

FIG. 1 is a block diagram illustrating a liquid crystal display device for adjusting an AVDD voltage according to an exemplary embodiment of the present invention.

Referring to FIG. 1, a liquid crystal display device according to an exemplary embodiment includes an LCD panel 10, a gate driver 20, a data driver 30, a VCOM generator 40, a grayscale reference voltage generator 50, a timing controller 60 and a DC-DC converter 100.

The DC-DC converter 100 converts a DC supply voltage having a high voltage level into an analog driving voltage AVDD, which is a DC voltage. The gate turn-on voltage VON and the gate turn-off voltage VOFF, which are also DC voltages, may be generated based on the AVDD voltage. The AVDD voltage may be charged up by means of a charge pump to generate the gate turn-on voltage VON and the gate turn-off voltage VOFF.

The timing controller 60 generates RGB data, source control signals for controlling the data driver 30 and gate control signals for driving the gate driver 20.

The gate driver 20 receives the gate turn-on voltage VON and the gate turn-off voltage VOFF and outputs a plurality of gate driving signals G1, G2, G3, . . . , and Gn via a plurality of gate lines in response to the gate control signal.

The VCOM generator 40 generates a common electrode voltage VCOM based on the AVDD voltage and provides the common electrode voltage to the LCD panel 10.

The grayscale reference voltage generator 50 generates a grayscale reference voltage based on the AVDD voltage and provides the grayscale reference voltage VDD to the data driver 30. The AVDD voltage may be a reference voltage for a black level.

The data driver 30 receives grayscale data and provides the LCD panel 10 with a plurality of data voltages (or analog grayscale voltages) D1, D2, D3 . . . , and DM via a plurality of data lines based on the grayscale reference voltage VDD in response to the source control signal.

The LCD panel 10 includes a plurality of gate lines, a plurality of data lines and a plurality of pixels to display images that correspond to the analog grayscale voltages D1, D2, D3 . . . , and DM in response to the gate driving signals G1, G2, G3, . . . , and Gn.

The LCD panel 10 includes a lower substrate (or a thin film transistor substrate), an upper substrate (or a color filter substrate) and a liquid crystal layer interposed between the lower and upper substrates.

Respective pixels include a TFT transistor, a liquid crystal capacitor, and a storage capacitor. The TFT transistor is formed on the lower substrate. The TFT transistor has a gate electrode connected to the gate line, a source electrode connected to the data line, and a drain electrode connected to each of the ends of the liquid crystal capacitor and the storage capacitor. Each of the other ends of the liquid crystal capacitor and the storage capacitor are connected to the common electrode. For example, the common electrode may be formed on the color filter substrate.

Figure 2:
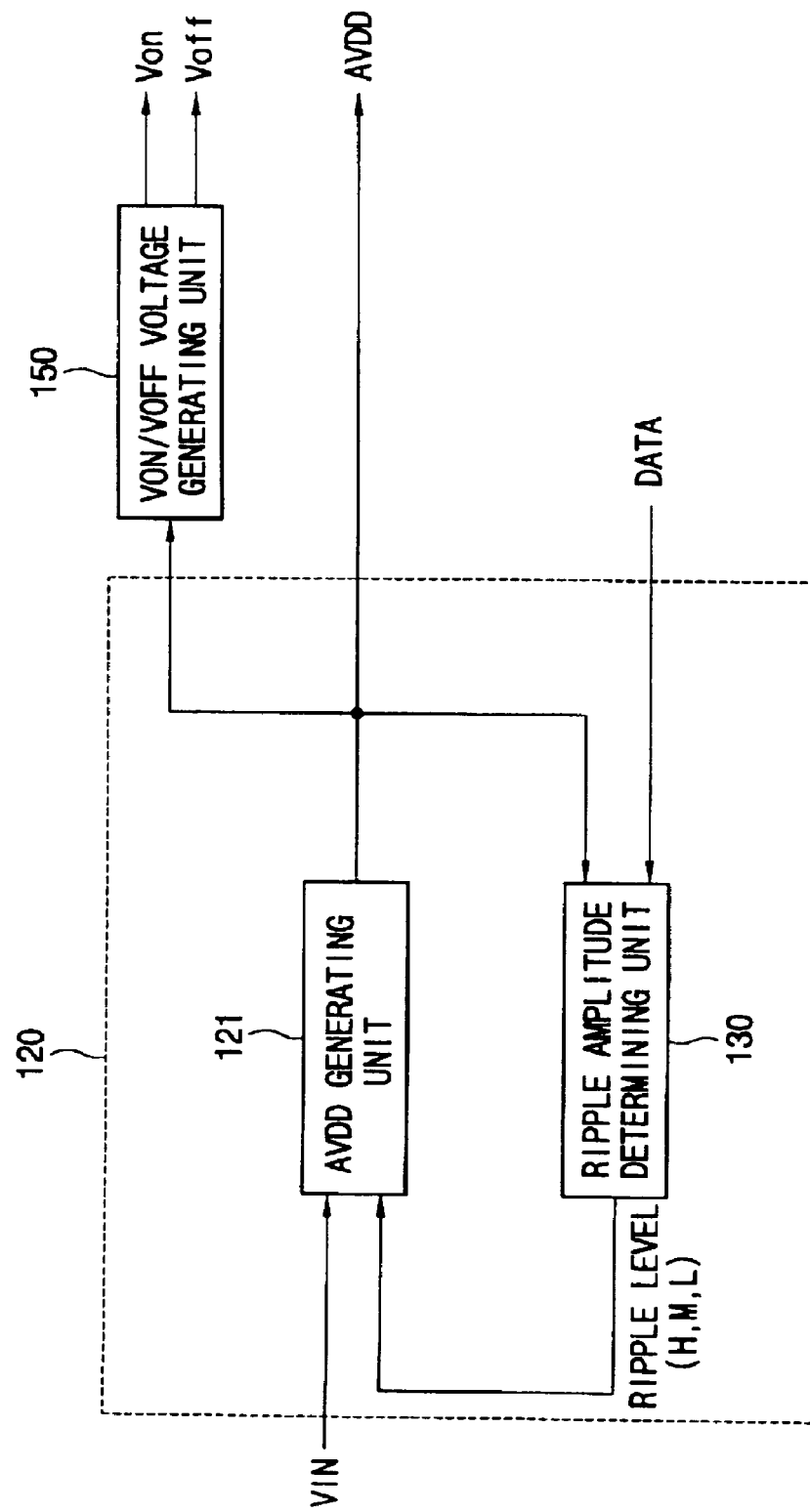
FIG. 2 is a block diagram illustrating a DC-DC converter for generating an adjusted AVDD voltage according to an exemplary embodiment of the present invention.

FIG. 2 is a block diagram illustrating a DC-DC converter for generating an adjusted AVDD voltage according to an exemplary embodiment of the present invention.

Referring to FIG. 2, the DC-DC converter 100 includes an AVDD voltage generating unit 120 and a VON/VOFF voltage generating unit 150.

The AVDD voltage generating unit 120 includes an AVDD generating unit 121 and a ripple amplitude determining unit 130.

The AVDD generating unit 121 increases or decreases the voltage level of the AVDD voltage according to a ripple pattern of the AVDD voltage. The ripple pattern is dependent on a ripple amplitude of the AVDD voltage.

Figure 3:
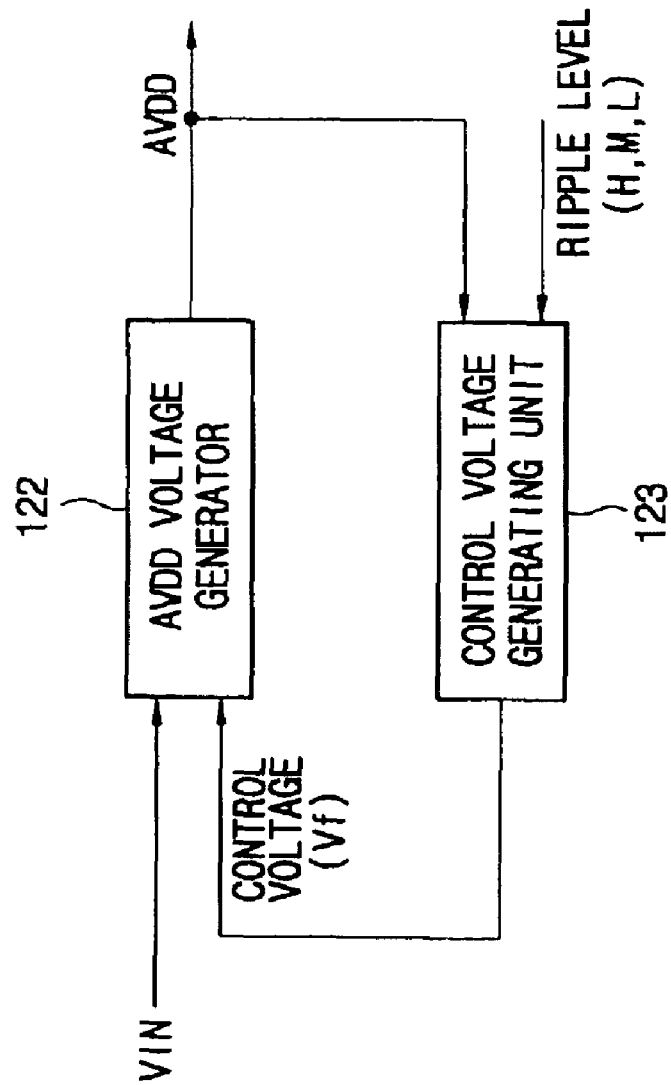
FIG. 3 is a block diagram illustrating an AVDD voltage generating unit in FIG. 2.

For example, an AVDD voltage generator 122 and a control voltage generating unit 123 may implement the AVDD generating unit 121, as shown in FIG. 3.

The AVDD voltage generator 122 changes the voltage level of the AVDD voltage according to the voltage level of a control voltage Vf. The AVDD voltage generator 122 decreases the voltage level of the AVDD voltage when the control voltage Vf decreases, and increases the voltage level of the AVDD voltage when the control voltage Vf increases.

For example, the AVDD voltage generator 122 may be implemented using a PWM (Pulse Width Modulation) signal generator. However, it is apparent to those skilled in the art that the AVDD voltage generator 122 may be implemented using any alternative circuit that causes the voltage level of the AVDD voltage to vary according to the control voltage Vf.

The control voltage generating unit 123 divides the analog driving voltage AVDD according to the ripple amplitude (or the ripple pattern) to produce the control voltage Vf.

Referring now to FIG. 2, the ripple amplitude determining unit 130 receives the AVDD voltage from the AVDD generating unit 121 to detect the ripple level of the AVDD voltage. The ripple amplitude determining unit 130 then determines whether the ripple level of the AVDD voltage corresponds to a high level (H), a middle level (M), or a low level (L) based on the ripple level of the AVDD voltage. The ripple level will be described later in more detail.

Figure 4:
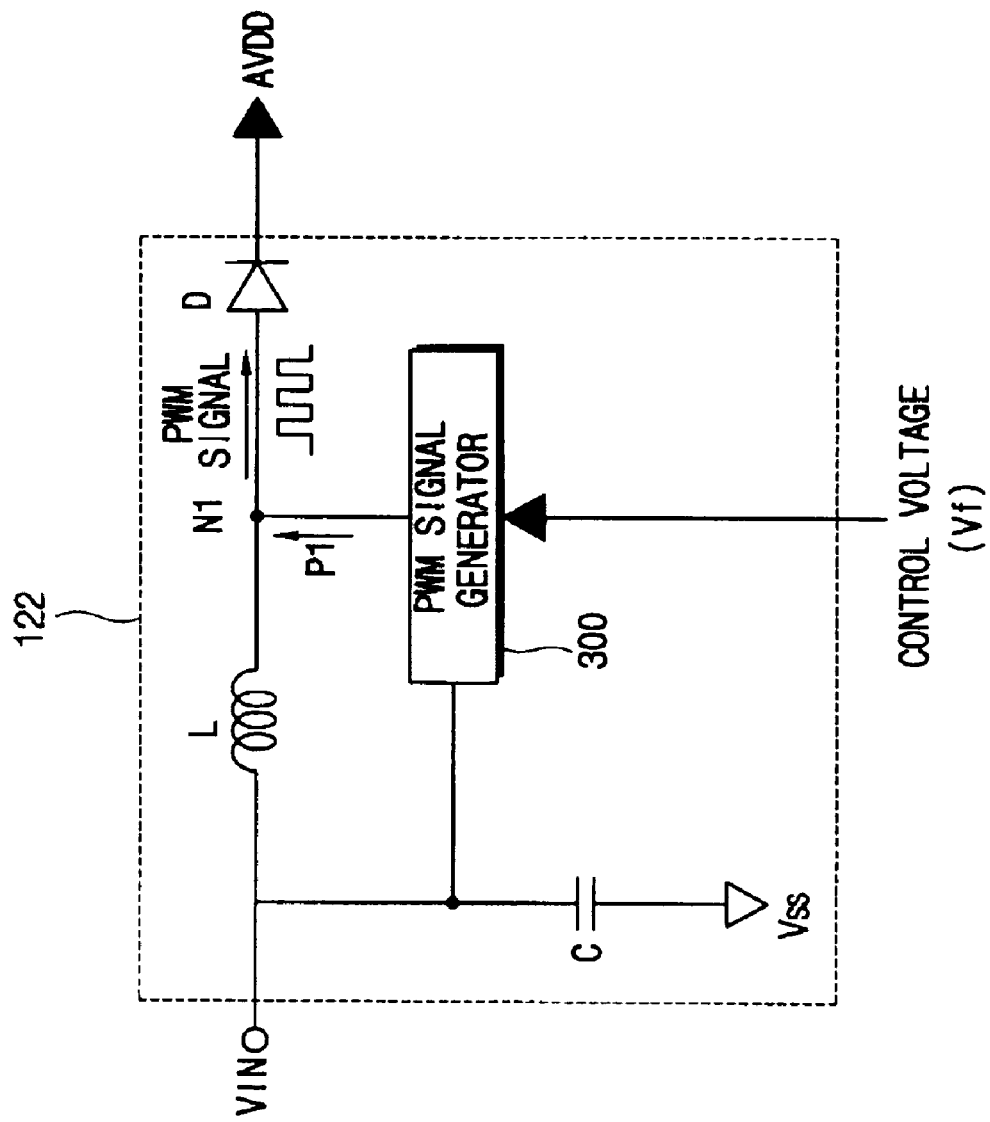
FIG. 4 is a block diagram illustrating an AVDD voltage generator in FIG. 3.
Figure 5:
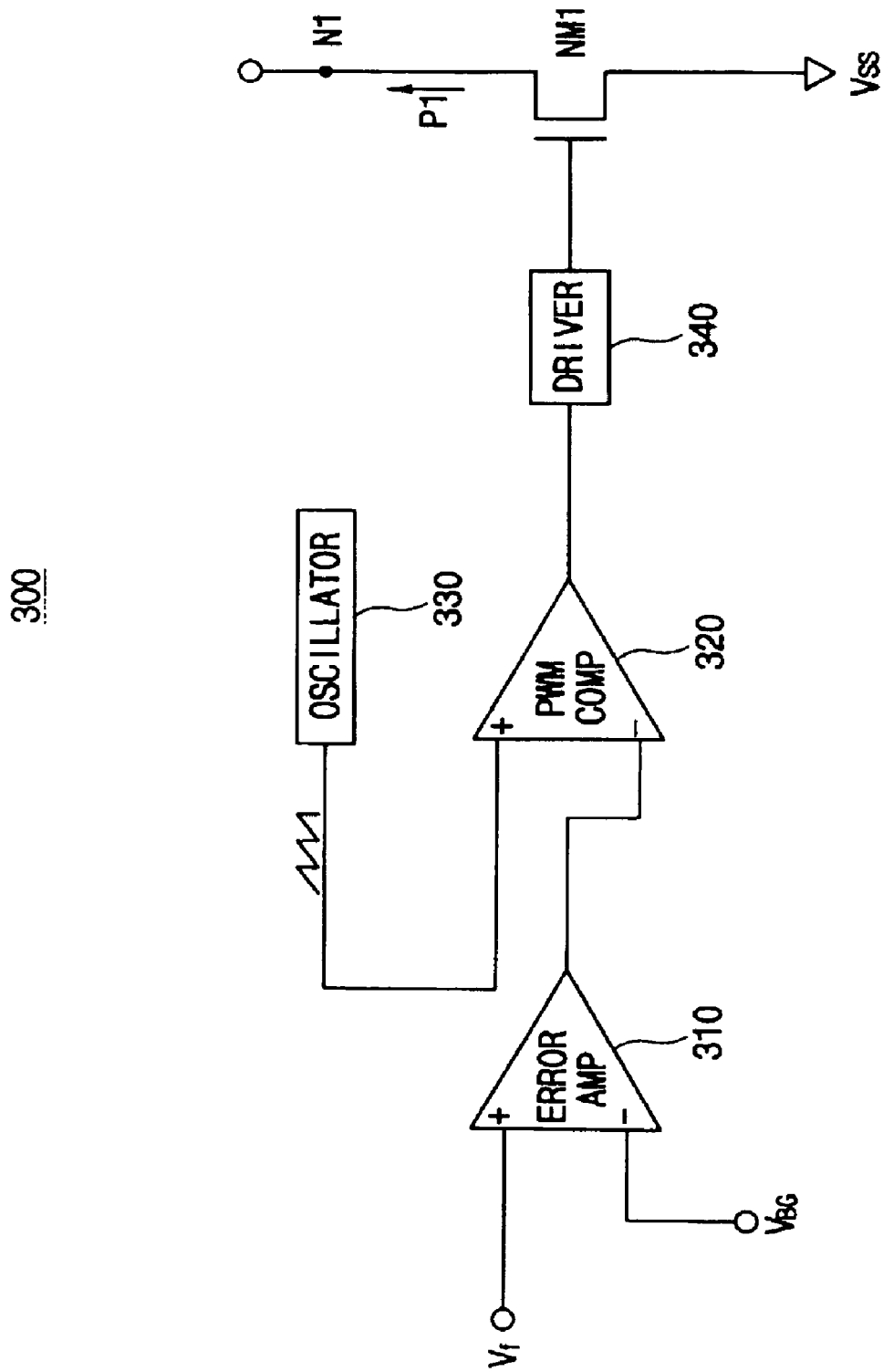
FIG. 5 is a block diagram illustrating a PWM signal generator in FIG. 4.

FIG. 4 is a block diagram illustrating an AVDD voltage generating unit in FIG. 3 and FIG. 5 is a block diagram illustrating a PWM signal generator in FIG. 4.

The AVDD voltage generator 122 generates a PWM signal based on a DC input voltage VIN and the control voltage Vf. The PWM signal is then rectified to obtain the AVDD voltage. A pulse width of the PWM signal is varied according to the control voltage Vf, to thereby change a voltage level of the AVDD voltage.

Referring to FIG. 4, the control voltage Vf that is generated by the control voltage generating unit 123 is provided to a PWM signal generator 300. For example, the control voltage Vf is a DC voltage that is obtained by dividing the AVDD voltage according to the ripple level of the AVDD voltage. For example, a PWM integrated circuit for DC-DC converters may implement the PWM signal generator 300.

The PWM signal generator 300 receives the input voltage VIN from a VIN input terminal that is coupled to VSS via a capacitor C.

A pulse width of a PWM signal that is generated by the PWM signal generator 300 is determined by the control voltage Vf. The pulse width of the PWM signal is decreased when the control voltage Vf decreases, to thereby decrease the AVDD voltage.

Referring to FIG. 5, the control voltage Vf is compared with a bandgap voltage VBG by an error amplifier 310. When the control voltage Vf is less than the bandgap voltage VBG, an output signal of the error amplifier 310 has a low voltage level, and when the control voltage Vf exceeds the bandgap voltage VBG, the output signal of the error amplifier 310 has a high voltage level.

A PWM comparator 320 receives a triangular wave from an oscillator 330 and an output signal from the error amplifier 310 to generate a PWM signal. When the output signal of the error amplifier 310 has the high voltage level, the PWM comparator 320 increases a duty cycle D of the PWM signal. When the output signal of the error amplifier 310 has the low voltage level, the PWM comparator 320 decreases the duty cycle D of the PWM signal. A driver 340 amplifies a current of the PWM signal outputted from the PWM comparator 320 and provides the amplified PWM signal to a gate of an NMOS transistor NM1.

When the NMOS transistor NM1 is turned on, a reverse bias is applied to a diode D in FIG. 4 to thereby turn off the diode D, and an inductor L in FIG. 4 is charged with electromagnetic energy. A pulse P1 outputted from the NMOS transistor NM1 has a Vss level. When the NMOS transistor NM1 is turned off, a forward bias is applied to the diode D to thereby turn on the diode D and the charged energy in the inductor L is output through the diode D as the AVDD voltage. The pulse P1 has a voltage level of (AVDD+VD). VD represents a voltage difference between both ends of the diode D.

When the control voltage Vf increases to exceed the bandgap voltage VBG, the duty cycle D of the PWM signal is increased. Accordingly, the inductor L is charged with an increased amount of energy to increase the pulse width of the PWM signal. Therefore, the level of the AVDD voltage is increased.

Figure 6:
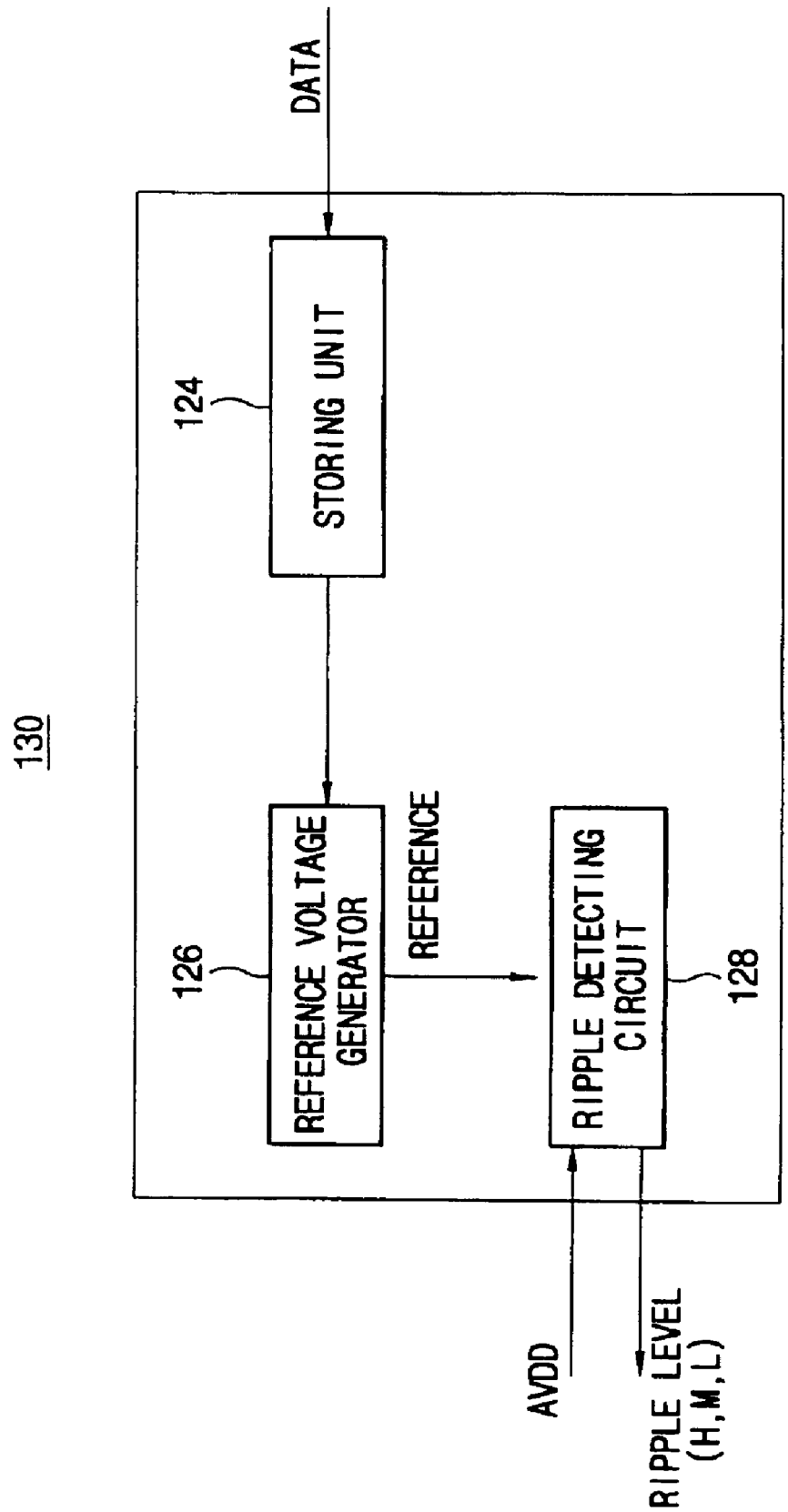
FIG. 6 is a block diagram illustrating a ripple amplitude determining unit in FIG. 2.
Figure 7:
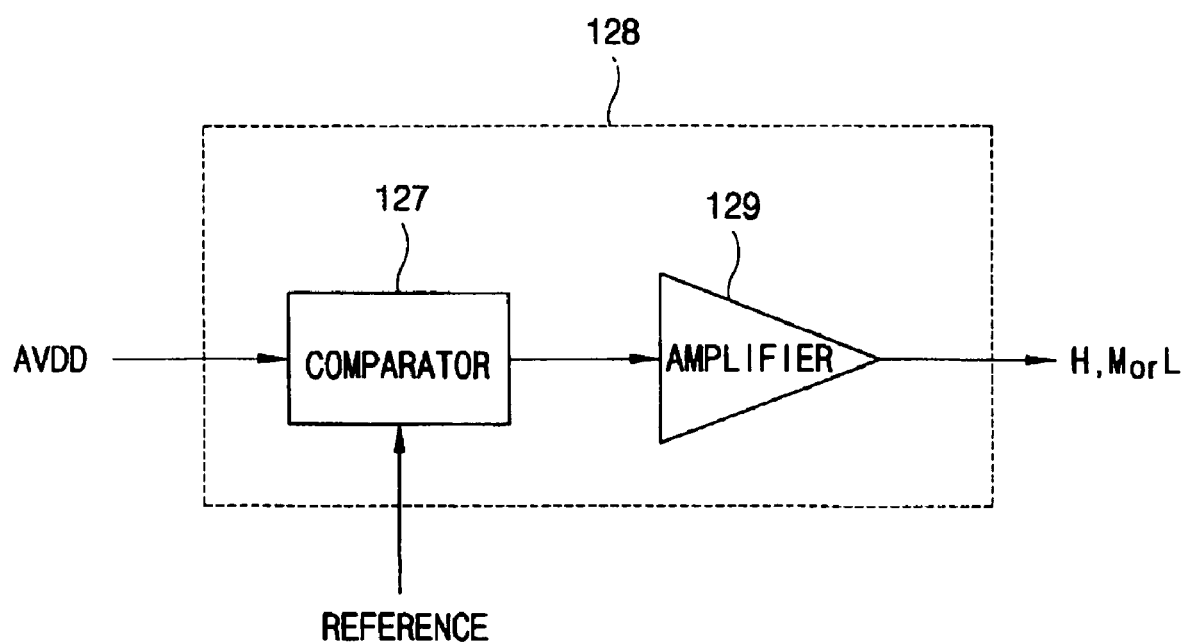
FIG. 7 is a block diagram illustrating a ripple detector in FIG. 6.
Figure 8:
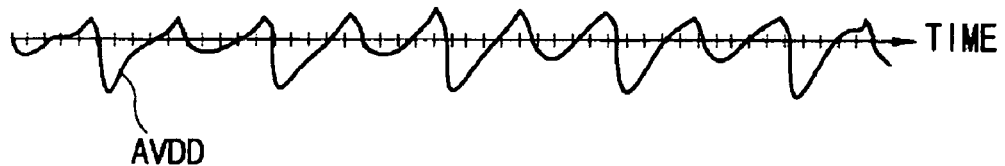
FIG. 8 is a graph showing a ripple waveform of an AVDD voltage.

FIG. 6 is a block diagram illustrating the ripple amplitude determining unit 130 in FIG. 2, FIG. 7 is a block diagram illustrating a ripple detecting circuit in FIG. 6, and FIG. 8 is a graph showing a ripple waveform of an AVDD voltage.

Referring to FIG. 6, the ripple amplitude determining unit 130 includes a storing unit 124, a reference voltage generator 126, and a ripple detecting circuit 128.

The storing unit 124 stores a ripple amplitude reference value. The ripple amplitude reference value is provided from an external source.

For example, the storing unit 124 may be implemented using a nonvolatile memory such as an Electrically Erasable Programmable Read Only Memory (EEPROM), an Erasable Programmable Read Only Memory (EPROM), a Read Only Memory (ROM), a Programmable read only memory (PROM), a Phase-change random access memory (PRAM), a Magneto-resistive random access memory (MRAM), a Ferro-electric random access memory (FRAM), a flash memory, etc.

The ripple amplitude reference value may be provided to the storing unit 124 in the form of Extended Display Identification Data (EDID) via an I2C Bus.

The I2C Bus is a serial bus, and includes two lines, such as clock line and data line, that are respectively used to transfer clock signals and data signals. A processor CPU communicates with memory chips by means of the I2C bus.

The ripple amplitude reference value may be preset based on the load characteristics of the liquid crystal display panel. For example, the ripple amplitude reference value may have a first reference value, a second reference value, and a third reference value. The first, second, and third reference values may vary depending upon the load characteristics of the liquid crystal display panel.

Table 1 shows an exemplary relationship between the AVDD voltage, a contrast ratio of a screen, and a maximum current consumption of the liquid crystal panel for a 12.1 inch liquid crystal display device.

TABLE 1

| AVDD | Contrast ratio | Current consumption of the liquid crystal panel (MAX) |
|---|---|---|
| 7.0 V | 300:1 | 360 mA |
| 7.4 V | 330:1 | 405 mA |
| 7.6 V | 350:1 | 420 mA |
| 7.8 V | 380:1 | 450 mA |
| 8.0 V | 400:1 | 470 mA |

As shown in the Table 1, the contrast ratio has a trade-off relationship with the current consumption of the liquid crystal panel according to the voltage level of the AVDD voltage.

Table 2 lists exemplary ripple amplitudes of the AVDD voltage in the 12.1 inch liquid crystal display device.

TABLE 2

| ripple amplitude of the AVDD voltage (mV) | Ripple level | Adjusted AVDD voltage (Volt) |
|---|---|---|
| Above 300 | HIGH | 7.6 |
| 200~300 | MIDDLE | 7.8 |
| 100~200 | LOW | 8.0 |

When the maximum change such as '101010 . . . 1010' (hereinafter, referred to as 'MAX pattern') results in a grayscale value, a total current consumption of the LCD panel has a predetermined upper value and the ripple amplitude of the AVDD voltage exceeds 300 mV in the 12.1 inch liquid crystal display device. In the MAX pattern, both an analog processing block such as the LCD panel and a digital processing block such as the timing controller 60 and the DC-DC converter 100 are influenced by the load characteristics. In this case, the AVDD voltage is adjusted to reduce the total current consumption of the LCD panel. For example, the AVDD voltage may be adjusted to about 7.6 volts so as to decrease the total current consumption of the LCD panel.

When the grayscale value corresponds to a white pattern or a mosaic pattern (hereinafter, referred to as 'LOW pattern'), the ripple amplitude of the AVDD voltage is between 100 mV and 200 mV in the 12.1 inch liquid crystal display device. In the mosaic pattern, the white and black grayscale are alternately shown on the dots of frames. In the LOW pattern, the digital processing block is more influenced by the load characteristics than the analog processing block such as the LCD panel. In this case, the contrast ratio is an important matter so that the AVDD voltage is adjusted to increase the contrast ratio. For example, the AVDD voltage may be adjusted to about 8.0 volts to maximize the contrast ratio.

When the grayscale value corresponds to a black pattern (hereinafter, referred to as 'MIDDLE pattern'), the total current consumption of the LCD panel is less than the total current consumption in the MAX pattern and greater than the total current consumption in the LOW pattern. In addition, the ripple amplitude of the AVDD voltage is between 200 mV and 300 mV in the 12.1 inch liquid crystal display device. In this case, the AVDD voltage may be adjusted to maintain the current voltage level. In the MIDDLE pattern, the analog processing block is more influenced by the load characteristics than the digital processing block.

That is, in the MAX pattern in which the current consumption is increased over a predetermined value, the AVDD voltage is adjusted to reduce the total current consumption of the LCD panel. In the LOW pattern in which the contrast ratio is of greater importance, the AVDD voltage is adjusted to increase the contrast ratio.

The first, second, and third reference values may be about 300, about 200, and about 100, respectively, in the 12.1 inch liquid crystal display device.

The reference voltage generator 126 generates reference voltages of 300 mV, 200 mV, and 100 mV based on the corresponding first, second, and third reference values, respectively, in the 12.1 inch liquid crystal display device.

The ripple detecting circuit 128 compares the ripple amplitude of the AVDD voltage with the reference voltage to generate ripple information concerning whether the ripple level of the AVDD voltage corresponds to HIGH, MIDDLE, or LOW. The ripple detecting circuit 128 provides the ripple information to the control voltage generating unit 123.

The ripple detecting circuit 128, as shown in FIG. 7, may include a comparator 127 and an amplifier 129. The comparator 127 receives the AVDD voltage and compares the ripple amplitude of the AVDD voltage with the reference voltage to determine whether the ripple level of the AVDD voltage corresponds to HIGH, MIDDLE, or LOW ripple level. The amplifier 129 amplifies an output of the comparator 127 to output the ripple information. Alternately, the ripple detecting circuit 128 may comprise the comparator 127 without the amplifier 129.

Alternatively, the ripple amplitude determining unit 130 may receive the ripple amplitude reference value and convert the ripple amplitude reference value into an analog reference voltage using a digital-to-analog converter (DAC). Then, the ripple amplitude determining unit 130 may compare the ripple amplitude of the AVDD voltage with the analog reference voltage to generate the ripple information concerning whether the ripple level of the AVDD voltage corresponds to HIGH, MIDDLE, or LOW ripple level.

Alternatively, the ripple amplitude determining unit 130 may amplify the AVDD voltage to a level so that the ripple amplitude of the AVDD voltage may be detected. Then, the ripple amplitude determining unit 130 may compare the ripple amplitude of the amplified AVDD voltage with the reference voltage.

The control voltage generating unit 123 generates the control voltage Vf based on the ripple information and provides the control voltage Vf to the AVDD voltage generator 122.

For example, the control voltage generating unit 123 may include a switching circuit and three voltage dividers for generating three divided voltages having first, second, and third voltage levels. For example, the voltage divider may be implemented using a resistor string.

In particular, the control voltage generating unit 123 selects one of the three voltage dividers based on the ripple information using the switching circuit, and the control voltage Vf having the first, second, or third voltage level is generated by the selected voltage divider. The first voltage level is less than the second voltage level, and the second voltage level is less than the third voltage level.

A method of adjusting of the AVDD voltage level in the 12.1 inch liquid crystal display devices will be described below.

For example, when the ripple level of the AVDD voltage corresponds to HIGH, a first control voltage Vf1 having the first voltage level is generated, and the AVDD voltage generator generates the AVDD voltage having about 7.6 volts.

In addition, when the ripple level of the AVDD voltage corresponds to MIDDLE, a second control voltage Vf2 having the second voltage level is generated, and accordingly, the AVDD voltage generator generates the AVDD voltage having about 7.8 volts.

In addition, when the ripple level of the AVDD voltage corresponds to LOW, a third control voltage Vf3 having the third voltage level is generated, and accordingly, the AVDD voltage generator generates the AVDD voltage having about 8.0 volts.

Referring now to FIG. 2, the VON/VOFF voltage generating unit 150 receives the AVDD voltage that is output from the AVDD voltage generator 122 and charges up the AVDD voltage to generate the gate turn-on voltage Von and the gate turn-off voltage VOFF. Although it is shown that the gate turn-on voltage VON and the gate turn-off voltage VOFF are generated using the AVDD voltage in FIG. 2, the gate turn-on voltage VON and the gate turn-off voltage VOFF may also be generated using a separate apparatus for generating the gate turn-on voltage VON and the gate turn-off voltage VOFF independently of the AVDD voltage.

Figure 9:
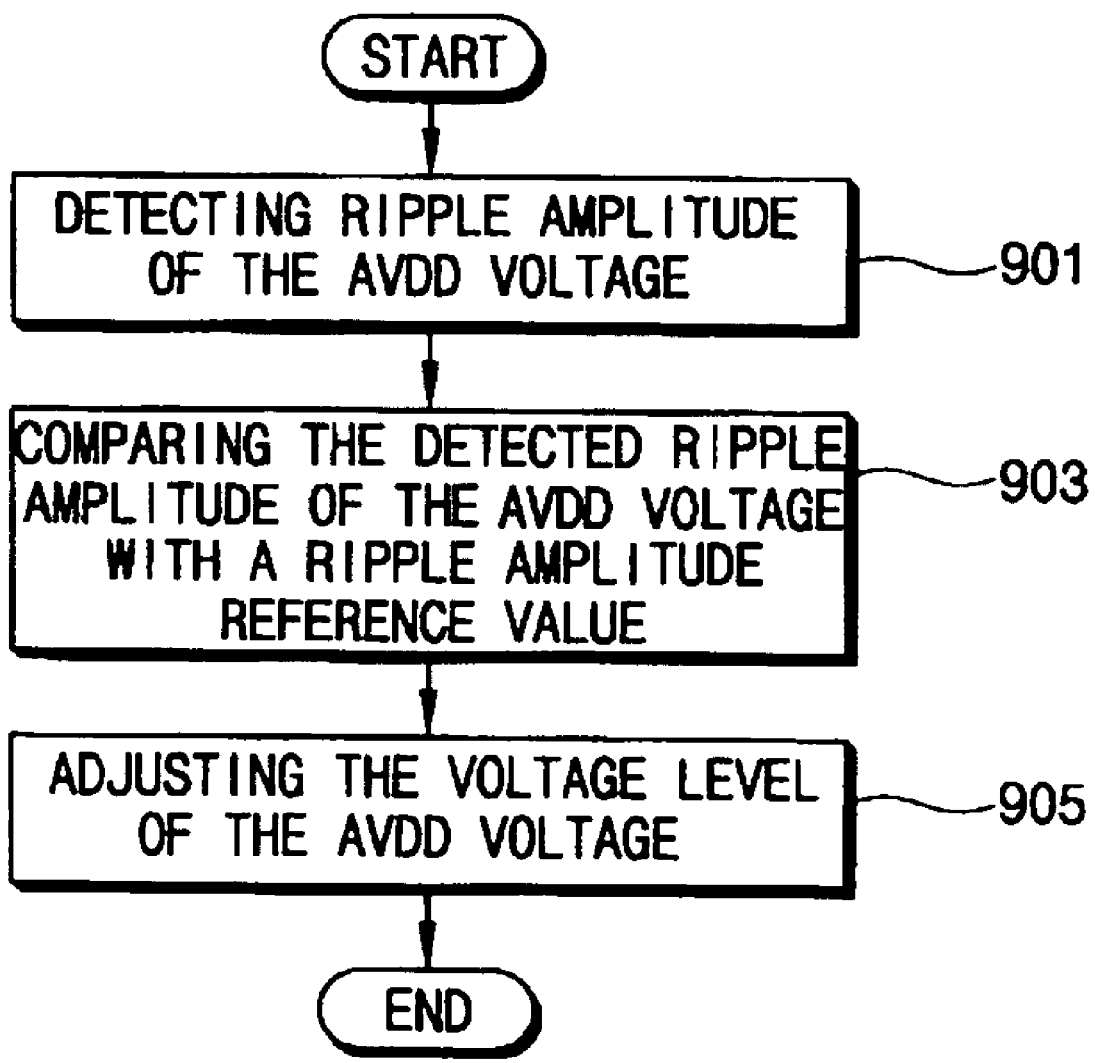
FIG. 9 is a flowchart illustrating a method of adjusting an AVDD voltage according to an exemplary embodiment of the present invention.

FIG. 9 is a flowchart illustrating a method of adjusting an AVDD voltage according to an exemplary embodiment of the present invention.

Referring to FIG. 9, the ripple amplitude of the AVDD voltage is detected, wherein the ripple amplitude of the AVDD voltage varies depending on the load characteristics (step 901). The detected ripple amplitude of the AVDD voltage is compared with a ripple amplitude reference value to determine whether the ripple level of the AVDD voltage corresponds to HIGH, MIDDLE, or LOW, wherein the ripple amplitude reference value is provided based on the load characteristics of the liquid crystal display panel (step 903).

The voltage level of the AVDD voltage is adjusted based on the determined ripple level of the AVDD voltage (step 905). For example, when the ripple level of the AVDD voltage corresponds to HIGH, the AVDD voltage of about 7.6 volts is generated. When the ripple level of the AVDD voltage corresponds to MIDDLE, the AVDD voltage of about 7.8 volts may be generated. In addition, when the ripple level of the AVDD voltage corresponds to LOW, the AVDD voltage of 8.0 volts is generated.

Figure 10:
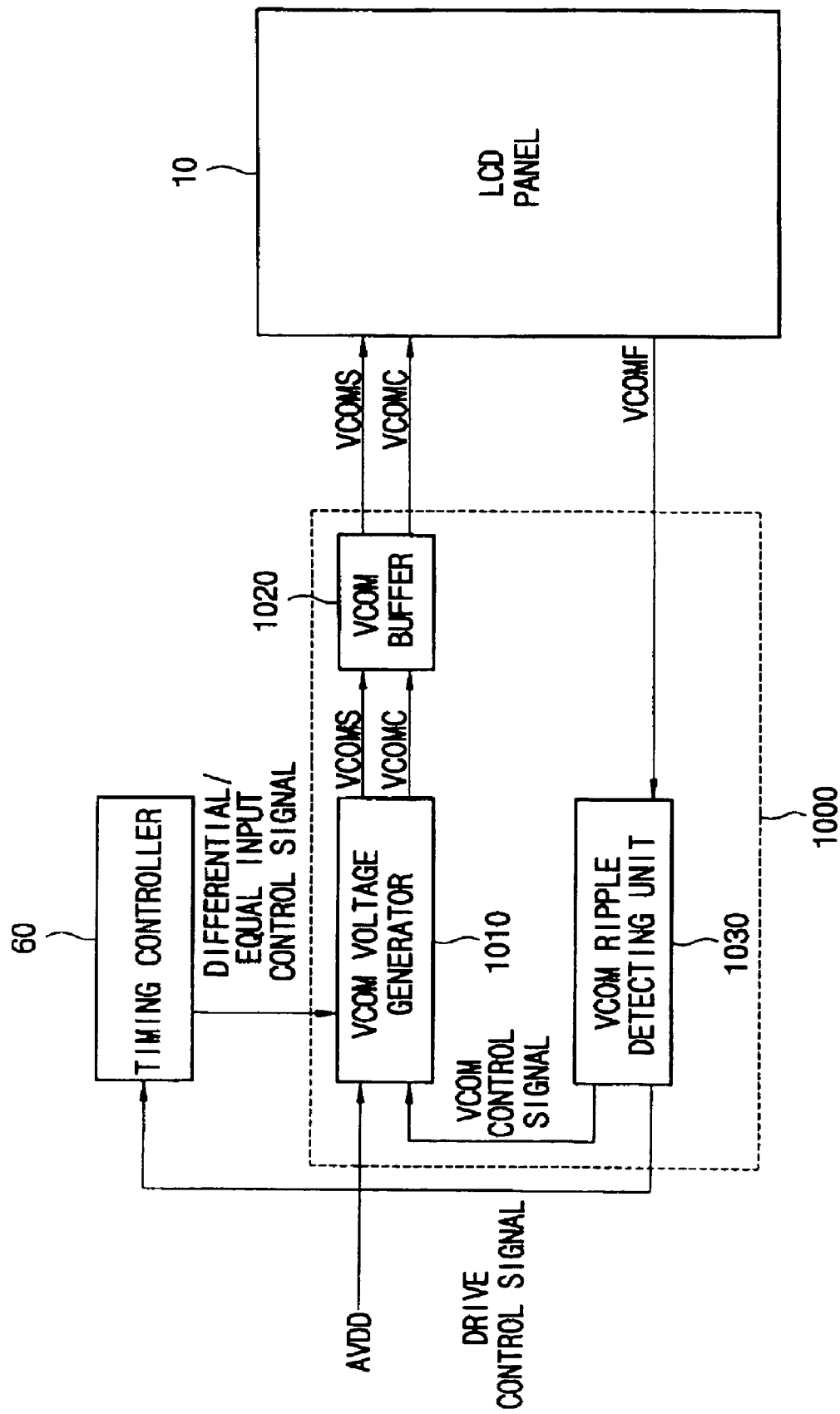
FIG. 10 is a block diagram illustrating a VCOM generating unit for generating an adjusted VCOM according to an exemplary embodiment of the present invention.
Figure 11:
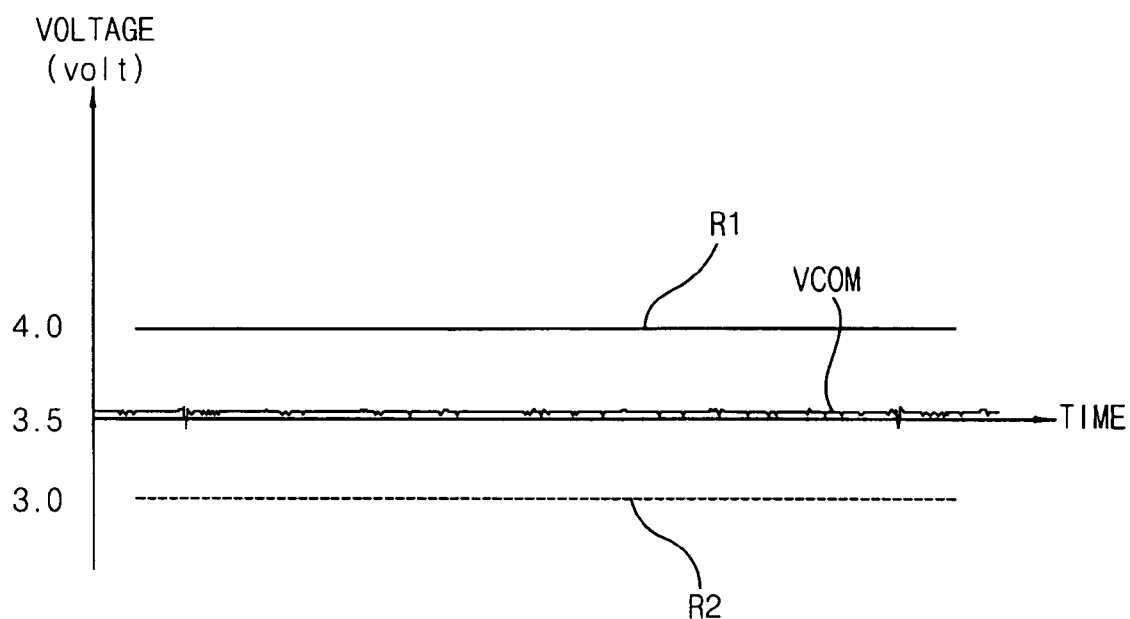
FIG. 11 is a graph showing a ripple waveform of a VCOM voltage in a white pattern.
Figure 12:
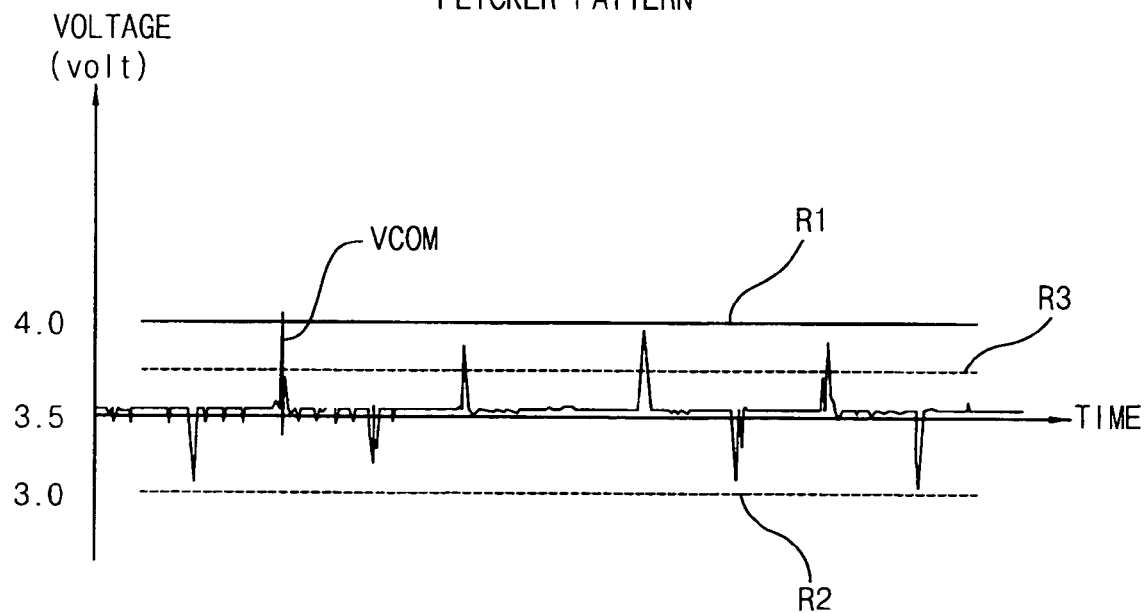
FIG. 12 is a graph showing a ripple waveform of a VCOM voltage in a black pattern.
Figure 13:
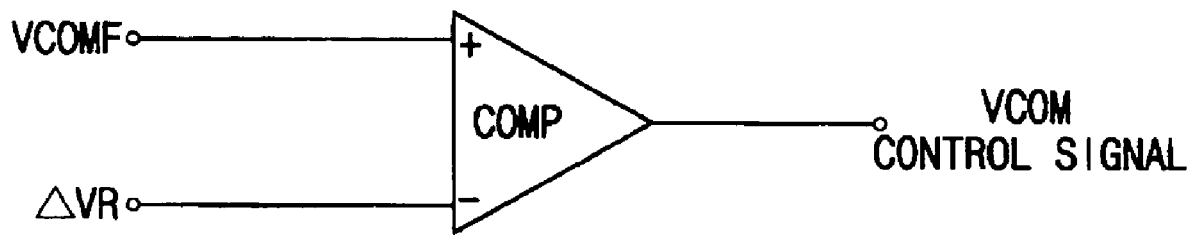
FIG. 13 is a block diagram illustrating a VCOM ripple detecting unit in FIG. 10.
Figure 14:
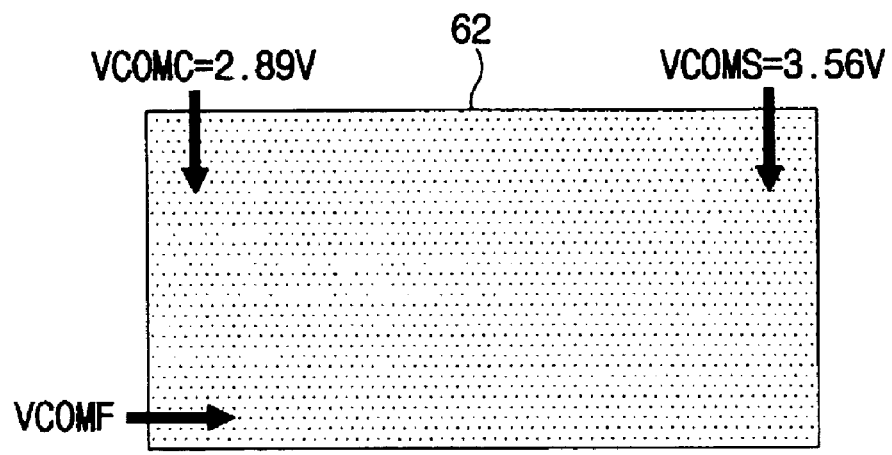
FIG. 14 is a schematic view when VCOM voltages are applied to a liquid crystal display panel in a differential input mode.
Figure 15:
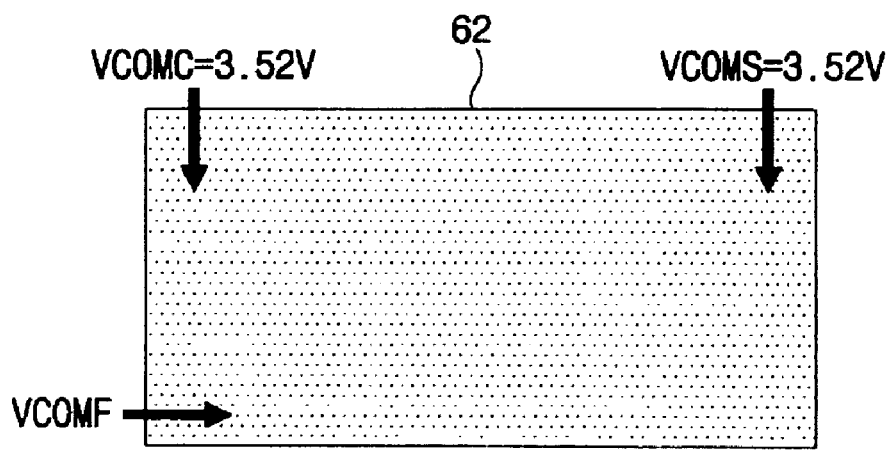
FIG. 15 is a schematic view when VCOM voltages are applied to a liquid crystal display panel in an equal input mode.

FIG. 10 is a block diagram illustrating a VCOM generating unit for generating a adjusted VCOM according to an exemplary embodiment of the present invention. FIG. 11 is a graph showing a ripple waveform of a VCOM voltage in a white pattern, and FIG. 12 is a graph showing a ripple waveform of a VCOM voltage in a black pattern. FIG. 13 is a block diagram illustrating the VCOM ripple detecting unit 1030 in FIG. 10. FIG. 14 is a schematic view when VCOM voltages are applied to a liquid crystal display panel in a differential input mode, and FIG. 15 is a schematic view when VCOM voltages are applied to a liquid crystal display panel in an equal input mode.

Referring to FIG. 10, the VCOM generating unit 1000 includes a VCOM voltage generator 1010, a VCOM buffer 1020, and a VCOM ripple detecting unit 1030.

The VCOM ripple detecting unit 1030 detects a VCOM voltage VCOMF at a common electrode of the LCD panel 10 and compares a ripple amplitude of the VCOMF with a predetermined ripple reference voltage ΔVr to generate a VCOM control signal and/or a drive control signal.

The VCOM voltage generator 1010 receives a differential/equal input control signal from the timing controller 60 and the VCOM control signal from the VCOM ripple detecting unit 1030 to generate a VCOMS (VCOMS SOURCE) signal and a VCOMC (VCOM CENTER) signal. In a differential input mode, the VCOMS signal and VCOMC signal having different voltage levels are applied to the LCD panel. The differential input mode may be available in a dual gate driver. In an equal input mode, the VCOMS signal and VCOMC signal having an equal voltage level are applied to the LCD panel. The equal input mode may is available in a single gate driver.

The VCOM buffer 1020 buffers the VCOMS signal and the VCOMC signal that are output from the VCOM voltage generator 1010. For example, a voltage follower may implement the VCOM buffer 1020.

The ripple amplitude of the common electrode voltage VCOM of the LCD panel is related to grayscale patterns of respective dots in an image frame that is displayed on the LCD panel 10. For example, the predetermined ripple reference voltage ΔVr may vary between about 0.5 volts and about 1.0 volts in 12.1 inch liquid crystal display devices. For example, the predetermined ripple reference voltage ΔVr may be about 0.5 volts. In addition, for example, the common electrode voltage may vary between about 3 volts and about 4 volts in 12.1 inch liquid crystal display devices.

For example, as shown in FIG. 11, when all of the respective dots in the image frame have grayscale levels corresponding to white (hereinafter referred to as "white pattern"), the ripple amplitude of the VCOM voltage is far less than the ripple reference voltage ΔVr. In FIG. 11, R1 represents an upper limit of a ripple voltage and R2 represents a lower limit of the ripple voltage. Namely, the ripple amplitude may correspond to a magnitude of the difference between R1 and R2. Although R1 is set as 4.0V and R2 is set as 3.0V in FIG. 11, the actual values of R1 and R2 may be determined empirically with optimization for each display device.

In addition, as shown in FIG. 12, in the MAX pattern or the flicker pattern, a ripple generates at about 3.5 volts and the ripple amplitude of the VCOM voltage is greater than the ripple reference voltage ΔVr. The ripple of the VCOM voltage is measured with respect to the reference level R3.

Meanwhile, although this is not shown in the drawings, when all the respective dots in the image frame have grayscale levels corresponding to black (hereinafter, referred to as "black pattern"), the ripple amplitude of the VCOM voltage may be less than or greater than the ripple reference voltage ΔVr.

Referring to FIG. 13, the VCOM ripple detecting unit 1030 may be implemented as a comparator COMP. The VCOM ripple detecting unit 1030 compares the VCOMF signal with the ripple reference voltage ΔVr. Particularly, when the ripple amplitude of the VCOM signal is greater than the ripple reference voltage ΔVr, the VCOM ripple detecting unit 1030 generates the VCOM control signal having a high level so that the VCOM voltage generator 1010 may decrease a voltage level of the VCOM voltage. In addition, when the ripple amplitude of the VCOM signal is less than the ripple reference voltage ΔVr, the VCOM ripple detecting unit 1030 generates the VCOM control signal having a low level so that the VCOM voltage generator 1010 may maintain a current voltage level of the VCOM voltage.

In addition, the VCOM ripple detecting unit 1030 may generate the drive control signal for converting 1×1 dot inversion driving method of the liquid crystal panel into 1×2 dot inversion driving method when the ripple amplitude of the common electrode voltage is greater than the ripple reference voltage ΔVr. The drive control signal and the VCOM control signal may be independently generated. Alternatively, the drive control signal and the VCOM control signal may be concurrently generated with each other.

For example, the VCOM voltage generator 1010 may include a switching circuit and a voltage divider having a resistor string. For example, a first voltage divider is selected to generate the VCOM voltage having a first voltage level when the VCOM control signal has a high level. For example, a second voltage divider is selected to generate the VCOM voltage having a second voltage level when the VCOM control signal has a low level. The first voltage level is less than the second voltage level.

The VCOM voltage generator 1010 receives the differential/equal input control signal from the timing controller 60 and provides the common electrode of the LCD panel 62 with the VCOMC voltage and the VCOMS voltage that have different voltage levels from each other in a differential input mode. For example, as shown in FIG. 14, the VCOMC voltage is about 2.89V and the VCOMS voltage is about 3.56V. The VCOM voltage generator 1010 provides the common electrode of the LCD panel 62 with the VCOMC voltage and the VCOMS voltage that have an equal voltage level each other in an equal input mode. For example, as shown in FIG. 15, both the VCOMC voltage and the VCOMS voltage are about 3.52V. Alternatively, the differential/equal input control signal may be provided from an external source.

In accordance with the present invention, the AVDD voltage is adjusted based on comparison between the ripple amplitude of the AVDD voltage and the ripple amplitude reference value that is provided based on the load characteristics of the LCD panel.

Therefore, when the ripple amplitude of the AVDD voltage corresponds to a ripple pattern in which the current consumption in the LCD panel has a predetermined upper value, the AVDD voltage may be decreased so that the current consumption in the LCD panel may be reduced. In addition, when the ripple amplitude of the AVDD voltage corresponds to a ripple pattern in which a maximum contrast ratio is required, the AVDD voltage may be increased so that the contrast ratio of images may be increased.

In addition, the VCOM voltage is adjusted based on comparison between the ripple amplitude of the VCOM voltage and a VCOM ripple amplitude reference value that is provided based on the load characteristics of the LCD panel.

Therefore, when the ripple amplitude of the VCOM voltage corresponds to the MAX pattern or the FLICKER pattern in which the current consumption in the LCD panel has a predetermined upper value, the VCOM voltage may be decreased so that the current consumption in the LCD panel and the flicker may be reduced. In addition, when the ripple amplitude of the VCOM voltage corresponds to the MAX pattern or the FLICKER pattern in which the current consumption in the LCD panel has a predetermined upper value, the 1×1 dot inversion driving method of the liquid crystal panel may be converted into a 1×2 dot inversion driving method so that the current consumption in the LCD panel and the flicker may be reduced.

Having thus described exemplary embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. An apparatus for generating an analog driving voltage comprising:
   a ripple amplitude determining unit configured to compare a ripple amplitude of an analog driving voltage with a given reference voltage, the given reference voltage corresponding to a preset ripple amplitude reference value, and configured to determine a ripple level of the analog driving voltage;
   an analog driving voltage generating unit configured to adjust a DC voltage level of the analog driving voltage based on the determined ripple level of the analog driving voltage,
   wherein the ripple amplitude determining unit includes
   a storing unit configured to store the ripple amplitude reference value, the amplitude reference value being preset based on load characteristics of the liquid crystal display panel;
   a reference voltage generator configured to generate the given reference voltage based on the ripple amplitude reference value; and a ripple detecting circuit configured to compare the ripple amplitude of the analog driving voltage with the given reference voltage based on load characteristics of a liquid crystal display panel to generate ripple information.

2. The apparatus of claim 1, wherein the analog driving voltage generating unit changes the DC voltage level of the analog driving voltage according to a control voltage, the control voltage being obtained by dividing the analog driving voltage based on the ripple amplitude of the analog driving voltage.

3. The apparatus of claim 2, wherein the analog driving voltage generating unit decreases the DC voltage level of the analog driving voltage when the control voltage decreases and increases the DC voltage level of the analog driving voltage when the control voltage increases.

4. The apparatus of claim 2, wherein the analog driving voltage generating unit includes:
   a control voltage generating unit configured to divide the analog driving voltage based on the ripple amplitude of the analog driving voltage to generate the control voltage; and
   an analog driving voltage generator configured to change the DC voltage level of the analog driving voltage based on the control voltage.

5. The apparatus of claim 4, wherein the analog driving voltage generator includes a PWM (Pulse Width Modulation) signal generator.

6. The apparatus of claim 1, wherein the ripple amplitude reference value is provided in a format of Extended Display Identification Data (EDID) via an I2C bus.

7. The apparatus of claim 1, wherein the ripple detecting circuit includes a comparator that compares the ripple amplitude of the analog driving voltage with the given reference voltage to generate the ripple information.

8. An apparatus for generating a common electrode voltage comprising:
   a common electrode voltage ripple detecting unit configured to compare a ripple amplitude of a common electrode voltage with a predetermined ripple reference voltage to generate a common electrode voltage control signal for controlling a voltage level of the common electrode voltage, the common electrode voltage being detected from a common electrode of a liquid crystal display panel; and
   a common electrode voltage generating unit configured to control the voltage level of the common electrode voltage based on the common electrode voltage control signal to generate the common electrode voltage,
   wherein the common electrode voltage ripple detecting unit includes a comparator for comparing the ripple amplitude of the common electrode voltage with the ripple reference voltage, and
   wherein the comparator generates the common electrode voltage control signal having a first level so as to decrease the voltage level of the common electrode voltage when the ripple amplitude of the common electrode voltage is greater than the ripple reference voltage.

9. The apparatus of claim 8, wherein:
   the common electrode voltage generating unit decreases the voltage level of the common electrode voltage in response to receiving the common electrode voltage signal having the first level.

10. The apparatus of claim 9, wherein:
    the comparator generates the common electrode voltage control signal having a second level when the ripple amplitude of the common electrode voltage is less than the ripple reference voltage; and
    the common electrode voltage generating unit maintains the voltage level of the common electrode voltage in response to receiving the common electrode voltage signal having the second level.

11. The apparatus of claim 10, wherein the common electrode voltage generating unit generates the common electrode voltage having a first level when the common electrode voltage control signal having the first level is applied to the common electrode voltage generating unit, and generates the common electrode voltage having a second level when the common electrode voltage control signal having the second level is applied to the common electrode voltage generating unit.

12. The apparatus of claim 11, wherein the voltage level of the first level is less than the voltage level of the second level.

13. An apparatus for generating a common electrode voltage comprising:
    a common electrode voltage ripple detecting unit configured to compare a ripple amplitude of a common electrode voltage with a predetermined ripple reference voltage to generate a common electrode voltage control signal for controlling a voltage level of the common electrode voltage, the common electrode voltage being detected from a common electrode of a liquid crystal display panel; and a common electrode voltage generating unit configured to control the voltage level of the common electrode voltage based on the common electrode voltage control signal to generate the common electrode voltage, wherein the common electrode voltage generating unit receives a differential/equal input control signal and generates a first common electrode voltage and a second common electrode voltage having different voltage levels in a differential input mode and generates the first and second common electrode voltages having an equal voltage level in an equal input mode.

14. An apparatus for generating a common electrode voltage comprising:

a common electrode voltage ripple detecting unit configured to compare a ripple amplitude of a common electrode voltage with a predetermined ripple reference voltage to generate a common electrode voltage control signal for controlling a voltage level of the common electrode voltage, the common electrode voltage being detected from a common electrode of a liquid crystal display panel; and a common electrode voltage generating unit configured to control the voltage level of the common electrode voltage based on the common electrode voltage control signal to generate the common electrode voltage, wherein the common electrode voltage ripple detecting unit generates a drive control signal for converting a 1×1 dot inversion driving method of the liquid crystal panel to a 1×2 dot inversion driving method when the ripple amplitude of the common electrode voltage is greater than the ripple reference voltage.

15. A method of controlling an analog driving voltage comprising:

storing a ripple amplitude reference value, the ripple amplitude reference value being preset based on load characteristics of a liquid crystal display panel;

generating a given reference voltage based on the ripple amplitude reference value;

detecting a ripple amplitude of an analog driving voltage wherein a common electrode voltage and a grayscale reference voltage are generated based on the analog driving voltage;

comparing the ripple amplitude of the analog driving voltage with the given reference voltage to determine a ripple level of the analog driving voltage, the given reference voltage corresponding to a preset ripple amplitude reference value; and adjusting a DC voltage level of the analog driving voltage based on the determined ripple level of the analog driving voltage.

16. A method of controlling an analog driving voltage comprising:

detecting a ripple amplitude of an analog driving voltage wherein a common electrode voltage and a grayscale reference voltage are generated based on the analog driving voltage;

comparing the ripple amplitude of the analog driving voltage with a given reference voltage to determine a ripple level of the analog driving voltage, the given reference voltage corresponding to a preset ripple amplitude reference value; and adjusting a DC voltage level of the analog driving voltage based on the determined ripple level of the analog driving voltage, wherein the adjusting the DC voltage level of the analog driving voltage comprises decreasing the DC voltage level of the analog driving voltage to a first voltage level when the ripple amplitude of the analog driving voltage corresponds to a ripple pattern in which a current consumption in a liquid crystal display panel has a predetermined upper value.

17. A method of controlling an analog driving voltage comprising:

detecting a ripple amplitude of an analog driving voltage wherein a common electrode voltage and a grayscale reference voltage are generated based on the analog driving voltage;

comparing the ripple amplitude of the analog driving voltage with a given reference voltage to determine a ripple level of the analog driving voltage, the given reference voltage corresponding to a preset ripple amplitude reference value; and adjusting a DC voltage level of the analog driving voltage based on the determined ripple level of the analog driving voltage, wherein the adjusting the DC voltage level of the analog driving voltage includes increasing the DC voltage level of the analog driving voltage to a second voltage level when the ripple amplitude of the analog driving voltage corresponds to a ripple pattern in which a maximum contrast ratio is desired.

18. A method of controlling an analog driving voltage comprising:

detecting a ripple amplitude of an analog driving voltage wherein a common electrode voltage and a grayscale reference voltage are generated based on the analog driving voltage;

comparing the ripple amplitude of the analog driving voltage with a given reference voltage to determine a ripple level of the analog driving voltage, the given reference voltage corresponding to a preset ripple amplitude reference value; and adjusting a DC voltage level of the analog driving voltage based on the determined ripple level of the analog driving voltage, wherein the ripple level of the analog driving voltage comprises one of a first ripple level, a second ripple level lower than the first level, and a third ripple level between the first and second ripple levels, and wherein the adjusting the DC voltage level of the analog driving voltage comprises:

decreasing the DC voltage level of the analog driving voltage to a first voltage level when the ripple amplitude of the analog driving voltage has the first ripple level;

increasing the DC voltage level of the analog driving voltage to a second voltage level when the ripple amplitude of the analog driving voltage has the second ripple level; and changing the DC voltage level of the analog driving voltage into a third voltage level when the ripple amplitude of the analog driving voltage has the third ripple level.

19. A method of controlling a common electrode voltage comprising:

detecting a common electrode voltage from a common electrode of a liquid crystal display panel;

comparing a ripple amplitude of the detected common electrode voltage with a predetermined ripple reference voltage to generate a common electrode control signal for controlling the common electrode voltage; and adjusting a voltage level of the common electrode voltage based on the common electrode control signal, wherein the generating the common electrode control signal includes generating the common electrode control signal having a first level so as to decrease the voltage level of the common electrode voltage when the ripple amplitude of the common electrode voltage is greater than the ripple reference voltage.

* * * * *